Dec. 27, 1966    A. S. KOLLOCK ETAL    3,294,610
METHOD AND APPARATUS FOR DISPENSING A PLURALITY OF
STRIPS OF MATERIALS IN OVERLYING RELATIONSHIP
Filed March 6, 1962    2 Sheets-Sheet 1
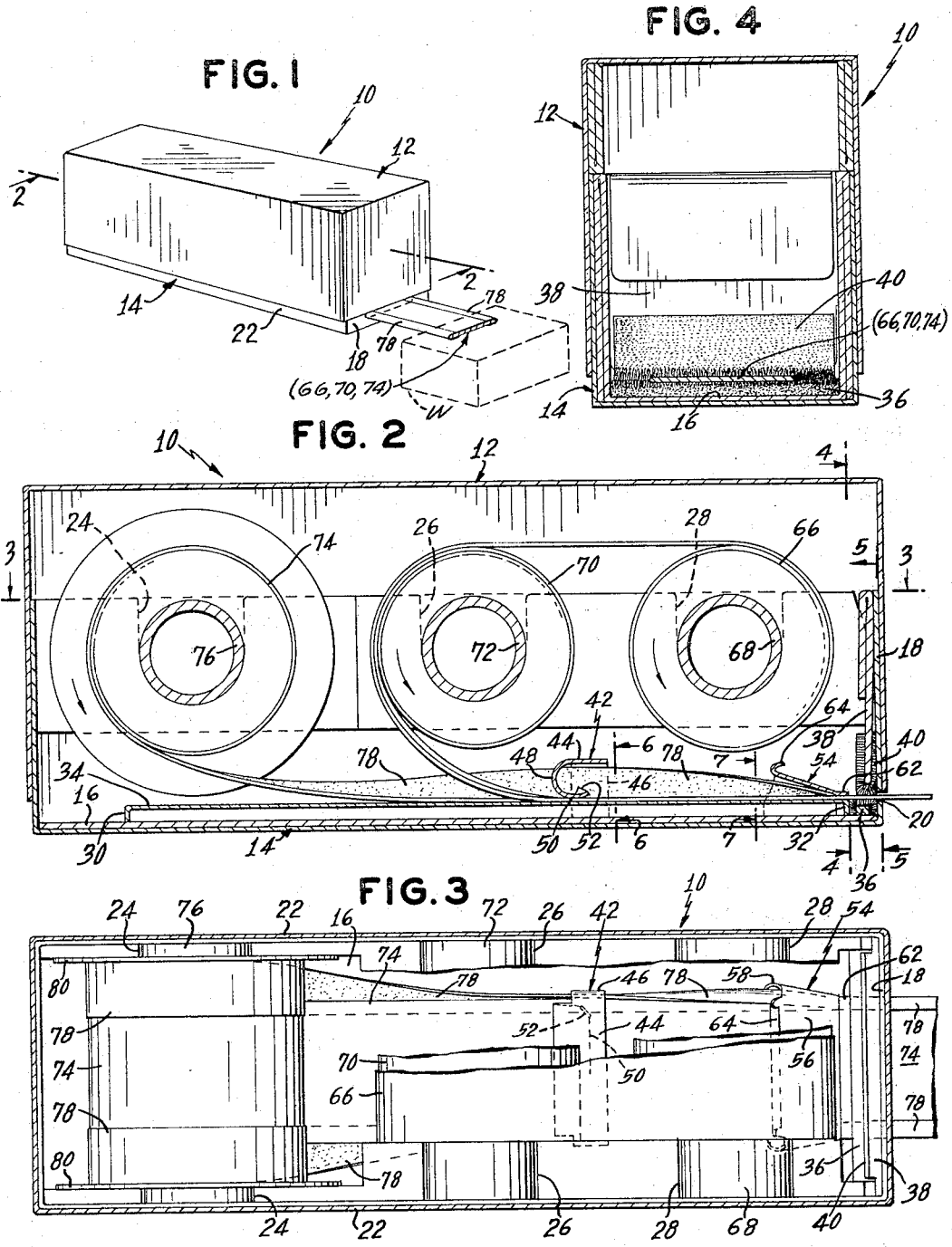
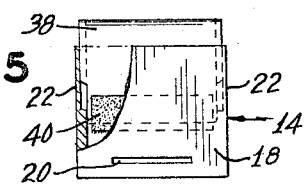
INVENTORS
ALAN S. KOLLOCK
CHARLES P. COVINO
BY
ATTORNEY

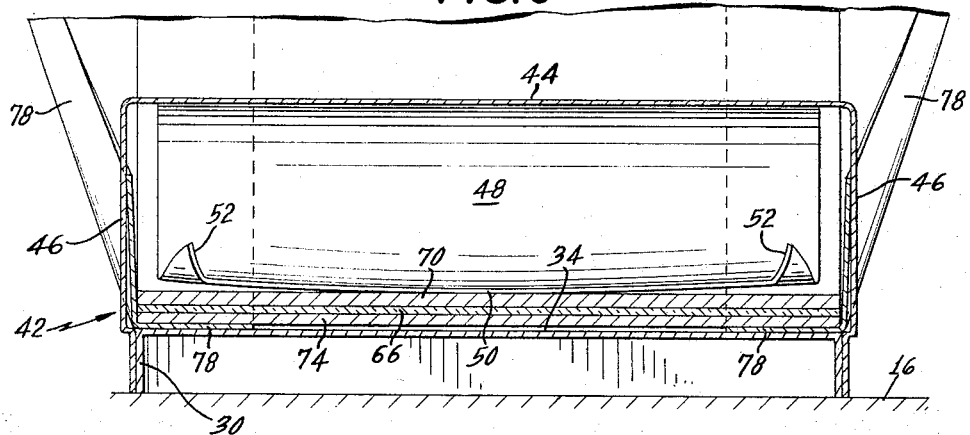
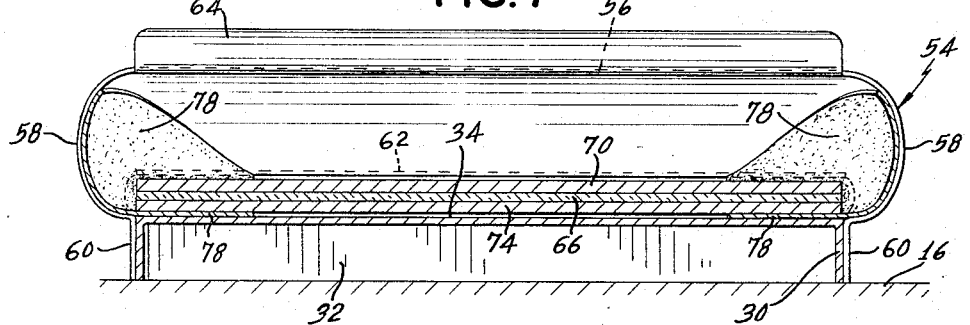
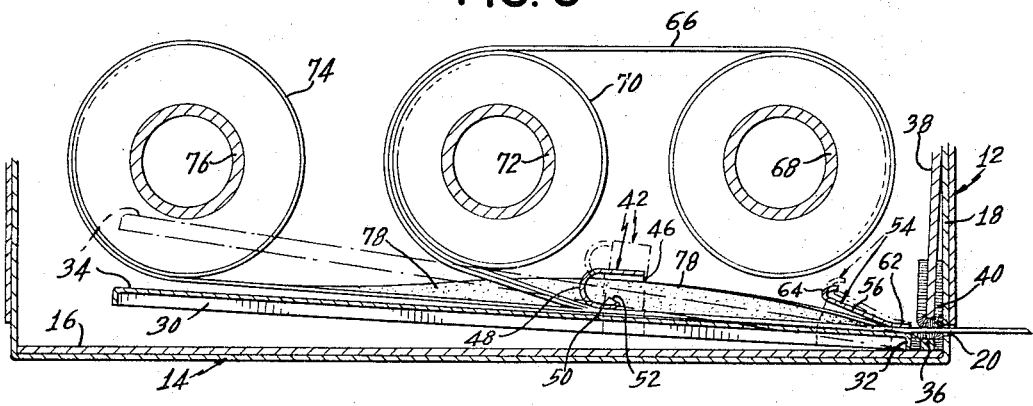
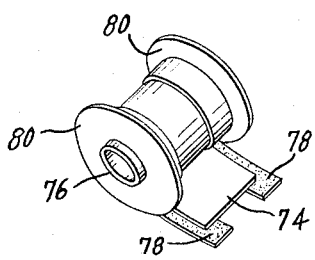
INVENTORS
ALAN S. KOLLOCK
CHARLES P. COVINO

United States Patent Office 3,294,610
Patented Dec. 27, 1966

3,294,610
METHOD AND APPARATUS FOR DISPENSING A PLURALITY OF STRIPS OF MATERIALS IN OVERLYING RELATIONSHIP
Alan S. Kollock, New Hyde Park, N.Y., and Charles P. Covino, Upper Montclair, N.J., assignors to General Magnaplate Corporation, Belleville, N.J., a corporation of New Jersey
Filed Mar. 6, 1962, Ser. No. 177,899
10 Claims. (Cl. 156—202)

This invention relates to a dispensing apparatus and to a novel method of dispensing a plurality of continuous strips of material in overlying conforming relationship to a surface.

This invention has particular application to the art of radiography wherein it is important to apply a light-sensitive film to a surface to be radiographed. In such cases, it is necessary that the film be enclosed in a film holder and that both the film holder and the film conform in close surface fitting engagement with the surface to be radiographed. In the past, it has been the practice to enclose pieces of film in individual casettes. Then, by making a series of time consuming individual overlapping exposures, it was finally possible to piece together a costly composite radiographic picture of the surface.

The desideratum of this invention is to enable the conforming application of a continuous strip of film to the surface to be radiographed and, at the same time, have the film enclosed in a continuous strip of film holder that will, in like manner, conform to the same surface.

Attempts at accomplishing the purposes of this invention have met with failure in the past, perhaps principally, because it was not possible to conveniently store sufficiently long lengths of the film and film holder materials and then dispense them in sufficiently long continuous lengths such that they would conform to and cover the surface to be radiographed. On the other hand, if sufficiently long lenths of the film holder and enclosed film material were able to be stored conveniently, as they were dispensed there would be bubbles or bulges in the film holder that would space the film unevenly from the surface to be radiographed thereby resulting in a distorted photographic representation of the surface.

An object of this invention is to provide an apparatus that will, in a novel manner, store greater continuous lengths of film and film holder materials within a compact portable housing than had been possible heretofore. In accomplishing this object, a feature of the invention resides in method and structure for supporting the film holder and film materials in the housing such that sufficiently great lengths of the same are available for dispensing from the housing.

Another object of the invention resides in the details of construction of the dispensing apparatus that enable the film holder and film materials to be supported individually in spaced relationship within the housing and to enable discrete lengths of the same to be dispensed simultaneously as and when the same are required to conform to the surface to be radiographed.

Still another object of the invention is to provide a dispensing apparatus wherein the film holder and film materials are in separate rolled sheets, supported individually in a housing, and wherein the film holder sheets are connected together with the film enclosed therebetween prior to being dispensed from the housing.

Still a further object of the invention is to provide a unique method of handling a plurality of materials whereby discrete lengths of the same may be dispensed simultaneously from a housing in which such materials are supported so that the lengths of materials are positioned in overlying engaging relationship with each other and in surface conforming engagement with the workpiece to which the same are applied.

Other and further objects of this invention reside in the structures and arrangements hereinafter more fully described with reference to the accompanying drawings in which:

FIG. 1 is a perspective view of the dispensing apparatus constructed according to the teaching of the invention, FIG. 2 is a cross-section of FIG. 1 taken in the direction of lines 2—2, FIG. 3 is a cross-section of FIG. 2 taken in the direction of lines 3—3, FIG. 4 is a cross section of FIG. 2 taken in the direction of lines 4—4, FIG. 5 is across section of FIG. 2 taken along lines 5—5, materially reduced in scale with a front portion of the lower part of the housing removed, FIG. 6 is an enlarged cross-section of FIG. 2 taken along lines 6—6, FIG. 7 is an enlarged cross-section of FIG. 2 taken in the direction of lines 7—7, FIG. 8 is a cross-section of the lower portion of the housing illustrating the operation of the guide means of the housing, and FIG. 9 is a perspective view of one of the rolled strips of film holder material.

Referring now to the drawings and more particularly to FIG. 1, the dispensing apparatus there shown is generally identified by the numeral 10. The dispensing apparatus comprises a housing formed in two parts, an upper housing part 12 and a lower housing part 14. Both the upper and the lower housing parts 12 and 14 are open on one of their sides. The opening of the upper housing part 12 faces downward and is adapted to telescopically receive the lower housing part 14 with the opening of the lower housing part 14 facing upward and being enclosed within the upper housing part 12.

The lower housing part 14 has a base 16 and a front wall 18 in which a dispensing aperture 20 is defined. The aperture 20 serves as an opening through which materials may be dispensed from the housing. Each of the oppositely facing upstanding side walls 22 of the lower housing part 14 is provided with a plurality of material supports in the form of U-shaped slots 24, 26 and 28 (see FIG. 2). Each set of the plurality of material supports 24, 26 and 28 is spaced relative to each other longitudinally along the length of the housing of the apparatus 10 and spaced relative to the dispensing aperture 20 to support material within the housing but in spaced relationship remote from the aperture.

Positioned within the lower housing part 14 and resting on the base 16 thereof is a movable member conveniently referred to hereafter as a foot member 30. The foot member 30 extends longitudinally along and loosely rests upon the base 16. Its forward end 32 is positioned adjacent to the dispensing aperture 20 and rests against the forward wall of the housing 14 to prevent play of the foot member 30 as the tape is dispensed. The foot member 30 has a planar surface 34 that extends from the aperture 20 lengthwise for substantially the full length of the base 16. Among other functions as will be presently described, the surface 34 also serves as a material support. The plane of the surface 34 is in alignment with the lower defining wall of the aperture 20 so that material moving from the housing and being dispensed through the aperture 20 will be in surface engagement with the surface 34 and thereby be smoothly guided for dispensing from the housing through the aperture.

Forming a part of the aperture 20 is a structure commonly referred to in the photographic industry as a sphincter. The sphincter shown in FIGS. 2, 4, 5 and 8 of the drawings comprises an element 36 of fabric material having a pile of construction whereby its piles normally obscure the aperture. The upper part of the sphincter structure includes a vertically movable plate 38 that is positioned behind the front wall 18 and has mounted on its lower surface a fabric material 40 of pile structure similar to that of the member 36. The plate 38 falls by gravity to cause its sphincter member 40 to engage with that of the lower sphincter member 36 so that the fabric piles of both members fit between each other and provide a light-tight interfitting engagement within the housing behind the aperture 20. The pile construction of the sphincter members 36 and 40 is such as to yield sufficiently to permit the passage of material through the aperture 20 for dispensing from the housing. This is aided by the vertical movement of the plate 38.

The details of the movable foot member 30 are shown enlarged in FIGS. 6 and 7. However, referring to FIGS. 2, 3, 6 and 8, it will be noted that the same has mounted on it a material guide structure generally identified by the numeral 42. The material guide structure 42 extends laterally across the width of the movable foot member 30 in the nature of a bridge having a top portion 44 that is bent vertically downward at its sides 46 for connection with the foot member 30 to support the top 44 above the planar surface 34. The top portion 44 is curved downward and rearwardly substantially U-shaped at 48 and terminates in a rear presser leg 50, the opposite lateral points of which are bent upward at 52 so the same will not dig into or tear the material to be dispensed from the apparatus 10. The material guide structure 42 is connected to the movable foot member 30 intermediate the longitudinal ends thereof.

Positioned adjacent to the forward end 32 of the movable foot member 30 is a closure device generally identified by the numeral 54 and more clearly shown in enlarged scale in FIG. 7. The closure device 54 has a bridging top plate 56 that terminates at its opposite ends in outwardly curved sides 58 that are connected at their lower ends 60 to the opposite sides of the movable foot member 30. The bridging top plate 56 is sloped downward relative to the planar surface 34 and terminates at its lower end in a front presser leg 62 that is in parallel spaced relationship to the planar surface 34. The upper end of the plate 56 is curved in a U-shape 64 away from but in the direction of movement of dispensing material so as not to interfere with the material to damage or tear it. The curved connecting sides 58 extend for the full length of the sloping bridge 56 and, therefore, the curvature of the same takes the appearance of a segment of a cone.

In the present invention, a plurality of rolled strips of material are adapted to be supported across each one of the spaced sets of supports 24, 26 and 28 provided in the facing walls 22 of the lower housing part 14. The strips of material are then fed from their rolls through the material guide structure 42 and then through the closure device 54 that guides the same for movement and direct dispensing through the aperture 20. When the present invention is utilized to dispense a plurality of materials especially adapted for radiography wherein one of these materials is a rolled strip of film 66 and the other of the materials are sheets of film holder 70 and 74 between which the film is to be enclosed, the rolled strip of film 66 is supported between the opposite side walls 22 of the lower housing part 14 in the set of side supports 28 as shown in FIGS. 2, 3 and 8.

The rolled strip of film material 66 is contained on a spool 68, the opposite ends of which seat in the supporting slots 28. The one rolled strip of the film holder sheets 70 is mounted on a spool 72 that seats at its opposite ends in the laterally spaced set of supports 26 provided on the side walls 22 of the lower housing part 14. The other rolled strip of film holder sheet 74 is mounted on a spool 76 that is supported between the laterally spaced supports 24 provided on the side walls 22 of the lower housing part 14. For purposes of explanation, it is noted that the rolled strip of film holder sheet 74 includes connecting means in the form of adhesive tapes 78 extending for the length thereof on each side; the adhesive tapes 78 being provided with an adhesive surface that is subsequently adapted to engage with lengths of the film holder sheet 70 to form a complete light-tight film holder for the enclosure of the strip of film 66 therebetween. That is, the film holder prevents light from passing therethrough to the film.

The details of the rolled strip of film holder sheet 74 are more specifically shown in FIG. 9. The spool on which the film holder sheet 74 is contained includes sides 80 that are attached to the spool center 76 and thereby serve as sidewise guides for the strip of the film holder sheet 74. It is noted that the spool 76 is the only one that is provided with the side guides 80. The spools 68 and 72 containing the rolled strips of film 66 and film holder sheet 70 need not have side guides because of the substantial body of their respective materials. The connecting means or adhesive tapes 78 provided on the strip of film holder sheet 74, however, do not have sufficient rigidity and, therefore, the sides 80 serve as guides for the movement of the same.

In the operation of the invention wherein the same is utilized to dispense the film 66 enclosed between the film holder sheets 70 and 74, it is necessary that as the composite or completed film holder and film are applied to a surface to be radiographed, that the film sheets and film be positioned in close or snug conforming surface engagement with the surface to be radiographed and that the film contained in the film holder be held snugly as possible to such surface to be radiographed. Unless the film conforms closely or snugly to the workpiece surface to be radiographed, distortion in the exposed picture will result, thereby resulting in imperfect representations of the structure of the surface workpiece.

In practice, it has been found that when a strip of film is placed within a rigid casette, the casette cannot be bent conformingly to the workpiece surface without causing a bubbling or spacing of one of the casette surfaces relative to the other, thereby causing a deleterious spacing of parts of the enclosed film from the workpiece surface. Hence, in carrying out the purposes of the instant invention, it is desirable that the apparatus 10 dispense the film holder sheets 70 and 74 in such manner that they will conform to each other in overlying surface engaging relationship and with the workpiece surface, and in such manner that they will tightly hold the film between them and in conformance to the shape of the workpiece surface.

After the rolled strip of film 66 and the rolled strips of film holder sheets 70 and 74 are mounted in their respective sets of supports 28, 26 and 24, an end portion of the strip of film holder sheet 74 is fed downward from its roll toward the planar surface 34 of the movable foot member 30 until it reaches the guide structure 42. Thereafter, the end of the length of the rolled strip of film holder sheet 70 is unrolled downward toward the planar surface 34 until it too reaches the guide structure 42 and is placed in overlying relationship with the first film holder sheet 74.

Subsequently, the end portion of the strip of film 66 is unrolled to extend over the second film holder sheet roll 70 and is pulled downward toward the planar surface 34 until it reaches the guide structure 42 at which time it is now positioned in surface engaging relationship between the two film holder sheets 70 and 74. In this way, the path of dispensing movement of the film 66 and the film holder sheet 70 are substantially the same Each of the three strips of material 74, 66 and 70 are then moved through the guide structure 42 in the direction of the aperture 20. Because the connecting means or adhesive tapes 78 are of flexible construction, as the strips of material move through the guide structure 42, the connecting means 78 are moved from their unrolled planar position into an upright position conforming to the upright shape of the guiding sides 46 of the material guide structure 42. This condition is more clearly illustrated in FIGS. 2, 3 and 6.

As the strips of material are fed through the guide structure 42, the rear presser leg 50 thereof applies a resilient downward force against the adjacent surface of the strip of film holder sheet 70 causing the same to move into close surface engagement with the strip of film 66 therebeneath and, in like manner, moving the latter into tight surface engagement with the next adjacent surface of the strip of film holder sheet 74. Thus, the rear presser leg 50 places the film 66 and the two film holder sheets 70 and 74 into tight engaging overlying relationship while the upright sides 46 of the guide structure 42 causes the adhesive tapes 78 of the film holder sheet 74 to bend upwardly so that the same will be positioned upright.

Continued feeding movement of the three engaged overlying strips of material 66, 70 and 74 toward the aperture 20 causes them to feed into the closure device 54. During this movement, the curved sides 58 direct the connecting means 78 downward gradually as the sheets move through the closure device after entering at the enlarged mouth thereof and exiting at the narrowed front presser leg 62 thereof Thus, the connecting means 78 are rolled downward and over and into surface engagement with the top strip of film holder sheet 70. In actual practice, the connecting means 78 are strips of opaque adhesive tape. However, any other form of connecting means may be utilized.

As the tapes 78 are rolled and folded over the outer surface of the film holder sheet 70, they adhere to the same. They are subsequently pressed into even tight engagement with the sheet 70 as the strips move beneath the pressure applying front presser leg 62 of the closure device 54. The result is the formation of a light tight film holder composed of the two strips of film holder sheets 70 and 74 connected by the tapes 78. The film 66 is contained between the film holder sheets and moves with the same as the film holder is dispensed from the housing of the apparatus 10. Continued movement of the film holder formed at the exit end of the front presser leg 62 causes the same to separate the engaging piles of the sphincter members 36 and 40 enabling the same to be dispensed through the aperture 20.

After a short length of the film holder 70, 74 is formed in the manner described above and caused to extend slightly beyond the aperture 20, the upper housing part 12 is slid telescopically downward over the opening of the lower housing part 14 and forms therewith a light-tight housing. In practice, the two housing parts 12 and 14 are taped together along the perimeter of the lower edge of the telescoping housing part 12 to insure against the entry of light into the interior of the apparatus 10.

The dispensing apparatus 10 is utilized in the following manner. After a short length of the film holder 70, 74 and film 66 extend beyond the aperture 20, the film holder and film are ready to be conformingly applied to any workpiece surface to be radiographed. This is done in the following manner. The short length of film holder 70, 74 extending beyond the aperture 20 from the dispensing apparatus 10 is placed on the workpiece surface and either taped to the same to prevent it from moving relative to the surface or restrained or held in any other convenient manner. Because of the compactness of the apparatus 10, it is then manually moved along the workpiece surface with the aperture 20 thereof positioned as close or as conformingly as possible to the surface of the apparatus 10 is moved therealong.

As the apparatus 10 is moved, a dispensing force is applied to the film holder sheets that are being held from movement relative to the workpiece surface W shown in phantom in FIG. 1 thereby causing the film holder 70, 74 and film 66 to be unrolled from the housing of the apparatus. If the workpiece surface is concave in configuration, a greater length of the film holder sheet 74 will be dispensed than the film holder sheet 70. On the other hand, if the workpiece surface is convex in configuration, a greater length of the film holder sheet 70 will be dispensed.

This will be obvious, for as the housing of the apparatus 10 is being moved along the workpiece surface W, discrete or separate lengths of the film holder sheets 70 and 74 are being withdrawn from the apparatus. These discrete lengths are then light-tightly connected together by the connecting means or adhesive tapes 78 at the closure device 54 to form the film holder before the same leaves the apparatus 10. In this way, the film holder 70, 74 is manufactured only as and when the same is needed and then only in direct conformance to the configuration of the workpiece surface to which it is being applied. It will be recognized that discrete lengths of the film holder sheets 70 and 74 conforming to the configuration of the workpiece surface are withdrawn from the housing of the apparatus 10 even though the same are being removed and dispensed simultaneously from such housing.

Those who are skilled in the art will readily recognize that the present invention is adapted to apply film enclosed within a light-tight film holder in conforming engaging relationship with a workpiece surface to be radiographed by the ability to dispense simultaneously discrete lengths of the film holder sheets in equal or unequal lengths depending upon the particular configuration of the workpiece surface. This is accomplished by enabling the manufacture and formation of the film holder 70, 74 immediately prior to its leaving or being dispensed from the housing of the apparatus 10.

However, at times, it is merely necessary to apply the radiographic film 66 to a flat workpiece surface. In such case, it is unnecessary to restrain the film holder 70, 74 and film 66 from movement relative to such surface while the housing of the apparatus 10 is moved. Rather, the opposite may be accomplished. The housing of the apparatus 10 may remain stationary while a predetermined or desired length of film holder 70, 74 and film 66 may be withdrawn therefrom. When the desired length of such materials have been withdrawn from the aperture 20 of the apparatus 10, the same is severed close to the aperture and is laid flat on the workpiece surface. Because the film sheet is in tight fitting surface engagement with the interior adjacent surfaces of the film holder sheets 70 and 74 by the application of pressures at the rear presser leg 50 and front presser leg 62, a sharper and clearer negative exposure is possible during the radiography of the workpiece surface.

When removing the film holder and film from the apparatus 10, a dispensing force is exerted on the film holder 70, 74 to cause the same to be withdrawn from the aperture 20 of the housing. This dispensing force is transmitted along the lengths of the strips of material 70, 74 and 66 to the guide structure 42. It will be noted that the strips of material have tangential paths of movement from their respective rolls to the guide structure 42. The tangential path of movement of the film holder sheet 74 is flatter than that of the film holder sheet 70 and the film 66 because the film holder sheet 74 is supported farthest from or spaced most remote relative to the aperture 20.

In consequence, when the dispensing force is applied to the materials 66, 70 and 74, the slight frictional resistance created by the rolling of the materials 66 and 70 is sufficient to apply a lifting or moving force to the rear presser leg 50 of the guide structure 42 causing the same to lift about the fulcrum created at the forward end 32 of the movable foot member 30. By applying a lifting or moving force to the guide means 42, the planar surface 34, connected to the guide structure 42, is also lifted and into substantial coincidence with the tangential path of movement of the film holder sheet 74. The planar surface 34 thus is normally lifted into surface guiding engagement with the film holder sheet 74. At the same time, the guide structure 42, including its rear presser leg 50, is always positioned during dispensing movement of the materials 66, 70 and 74 as to press the materials into tight surface engaging overlying relationship, eliminating all spaces between them.

However, because of the nature of the material of the film holder sheets 70 and 74, it is important that the same move smoothly from their rolls to the workpiece surface without wrinkling or distortion. To accomplish this, the planar surface 34 is elongated in length beyond the rolled strip of film holder sheet material 74. Hence, when a lifting force is exerted on the guide structure 42 during the dispensing or withdrawal of the film holder sheets and film materials from the apparatus 10, the extended length of the planar surface 34 will be moved upward and into abutment with the undersurface of the rolled strip of the film holder sheet 74 to control the rate of movement of the film holder sheet 74. That is, when the surface 34 abuts the film holder sheet 74 it essentially acts as a break to prevent undue unrolling of the film holder sheet 74.

When the planar surface 34 abuts the roll of the film holder sheet 74, it is prevented from continued movement upward and thereby limits the continued upward movement of the guide structure 42 so that the guide structure 42 will not move upward or beyond the tangential path of movement of the film holder sheet 74. It will be obvious that as greater amounts of material are unrolled from the spool 76 that is positioned most remote from the aperture 20, the sides of the roll will become gradually smaller. In consequence, the planar surface 34 will be moved and lifted higher because of the dispensing force exerted on the materials at the guide structure 42. However, in no event may the guide structure 42 be lifted upward or beyond the normal tangential path of movement of the rolled strip of material supported at 24 most remote from the aperture 20.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

We claim:

1. The method of conformingly applying film to the surface of a workpiece to be radiographed wherein said film holder includes a plurality of sheets of material light-tightly connected together along their longitudinal edges, said method comprising separately supporting said film and said plurality of sheets of material within a portable light-tight housing, withdrawing from said housing a portion of said sheets of material and connecting said sheets of material along their longitudinal edges with said film encased therebetween, holding said withdrawn portion of said sheets of material from movement relative to said surface to be radiographed, and moving said housing relative to said surface to withdraw lengths of each of said plurality of sheets therefrom while conformingly applying the sheets and the film to the surface to be radiographed.

2. The method of conformingly applying film to a surface wherein the film is enclosed in a light-tight film holder having a pair of connected sheets, said method comprising separately supporting each of said sheets and said film in a light-tight portable housing for withdrawal of said sheets and film therefrom, positioning said film between said separately supported sheets in said housing, withdrawing from said housing a portion of said sheets with said film therebetween, moving said housing conformingly along said surface while restraining said withdrawn sheets and film from movement with said housing and relative to said surface whereby lengths of said sheets and film are withdrawn simultaneously from said moving housing in conformance with the surface along which said housing moves, and light-tightly connecting together said sheets along their lengths to form a light-tight holder for said film therebetween before the same are withdrawn from said light-tight housing.

3. In an apparatus for dispensing a plurality of strips of material in predetermined overlying relationship, a housing, means in said housing to support said strips of material therein, an aperture defined in said housing through which said strips of material are dispensed in said predetermined overlying relationship, a foot member means in said housing beneath said supported strips of material, and means on said foot member to guide said strips of material for movement into their predetermined overlying relationship and to said aperture and to move said foot member toward said supported strips of material when a dispensing force is exerted on said material to dispense the same from said aperture.

4. An apparatus for dispensing a plurality of strips of material in predetermined overlying relationship comprising a housing having a dispensing aperture defined therein, means for supporting each of said plurality of strips of material in said housing spaced relative to each other and relative to said aperture with each of said strips of material moving in a path from its respective support to said aperture, a foot member in said housing, and guide means on said foot member to position said plurality of strips of material into their predetermined overlying engaging relationship and to cause said foot member to assume a position substantially coincidental with the path of movement of the one of said plurality of strips of material spaced most remote from said aperture in response to a dispensing force exerted on said strips of material.

5. An apparatus for dispensing a plurality of at least three rolled strips of material comprising a housing having an aperture defined therein and through which said material is dispensed, means in said housing to support said rolled strips of material spaced relative to each other and relative to said aperture, guide means in said housing spaced from said plurality of rolled strips of material to guide said strips of material to said aperture and being movable toward said rolled strips of material by said guided strips of material in response to a dispensing force exerted on said strips of material, the path of movement of at least two of said rolled strips of material being substantially the same and the path of movement of said third rolled strip of material being different from that of said two rolled strips of material, and means connected with said guide means and movable therewith into engaging cooperation with said third rolled strip of material to prevent said guide means from disturbing the path of movement of said third rolled strip of material during the dispensing of said material through said aperture.

6. In a material dispensing apparatus, a housing having an aperture defined therein through which material may be moved to be dispensed therefrom, a plurality of materials contained in said housing each to be dispensed in lengths from rolls thereof, means to individually support each of said rolls of said material in said housing, and means in said housing to guide the dispensing of lengths of said material from their respective rolls to align the same with said aperture and including means to position each of said dispensing materials to cause the same to move into overlying engaging relationship in said housing prior to their dispensing movement through said aperture.

7. In a material dispensing apparatus, a housing having an aperture defined therein through which material may be moved to be dispensed therefrom, at least three rolls of materials each in said housing, means in said housing to support each of said rolls of said materials spaced relative to each other and relative to said aperture, guide means in said housing to guide the dispensing of said materials from their respective rolls to said aperture whereby the dispensing paths of movement of certain of said materials differs from that of the paths of movement of others of said materials, said guide means being movable into substantial coincidence with the dispensing path of movement of a certain one of said materials, and means to limit the movement of said guide means.

8. In an apparatus for dispensing film contained in a film holder that includes a pair of connected film holder sheets wherein said film is dispensed from a roll and said pair of film holder sheets each is dispensed from individual rolls with one of said film holder sheets having connecting means, said dispenser apparatus comprising a light-tight housing having an aperture defined therein through which said film holder and film is dispensed, means to support said rolls of film holder sheets and film in said housing, guide means in said housing to receive said film and film holder sheets from their respective rolls and to guide the same into overlying surface engaging relationship with said film between said film holder sheets, said guide means including means to move said connecting means of said one film holder sheet into connection with the other of said film holder sheets to form the film holder with the film contained therebetween, said guide means being movable in response to a dispensing force exerted on said film holder sheets and film, and means cooperating with said guide means to limit the movement of said guide means.

9. In a dispensing apparatus for dispensing film contained in a film holder wherein said film is dispensed from a roll and said film holder includes two sheets each dispensed from separate rolls with one of said sheets having connecting means, said dispensing apparatus comprising a light-tight housing having an aperture defined therein through which said film holder and film contained therein is dispensed, means to support said rolls of film and film holder sheets spaced relative to each other within said housing and in varying spaced relationship remote from said aperture, guide means in said housing to receive the dispensing sheets and film and to guide the same into overlying surface engagement with said film between said film holder sheets, said guide means including means to move said connecting means of said one film holder sheet into connection with the other of said film holder sheets to contain the film therebetween, said sheets and film each having a tangential path of movement from their respective rolls to said guide means, said guide means being movable in said housing into substantial coincidence with the path of movement of a certain one of said film holder sheets, and means connected with said guide means and movable therewith and into engagement with the roll of said certain one of said film holder sheets to limit the movement of said guide means whereby the same will leave undisturbed the tangential path of movement of said certain one of said film holder sheets.

10. In a material dispensing apparatus for dispensing radiation-sensitive film in a continuous sheath that includes a pair of connected light-proof outer sheets sealed at their edges, said apparatus comprising a light-tight housing wherein said film is fed from a roll and each sheet is fed from an individual roll with one of the sheets having light-proof marginal sealing tapes on its outer surface near the lateral edge, said rolls being in the housing, said housing having an aperture through which the sheath-encased film is dispensed, means to support said rolls in said housing, guide means in said housing to receive said radiation-sensitive film and sheets from their respective rolls and to guide the same into overlying surface engaging relationship with said film between said sheets, said guide means including means to cause said tapes to move into sealing engagement with the other of said sheets of said sheath with the film contained therein.

References Cited by the Examiner

UNITED STATES PATENTS

| | | | |
|---|---|---|---|
| 1,963,666 | 6/1934 | McCarthy et al. | 156—554 |
| 2,012,014 | 8/1935 | McCarthy | 156—554 X |
| 2,107,603 | 2/1938 | Ellenburg | 242—55.3 |
| 2,154,440 | 4/1939 | Crotts | 242—55.3 |
| 2,307,406 | 1/1943 | Howard | 156—199 |
| 2,374,103 | 4/1945 | Johnson | 156—554 X |
| 2,388,770 | 11/1945 | Stein | 156—202 |
| 2,522,773 | 9/1950 | Bihary | 156—554 |
| 2,625,200 | 1/1953 | Hirszson | 156—577 X |
| 2,951,656 | 9/1960 | Wellman | 242—71.1 |
| 3,031,356 | 4/1962 | Bousquet et al. | 156—202 |
| 3,037,717 | 6/1962 | Thomasma et al. | 242—55.3 |

FOREIGN PATENTS 373,610   3/1907   France.

EARL M. BERGERT, *Primary Examiner.*

W. B. WALKER, P. DIER, *Assistant Examiners.*